Figure 1:
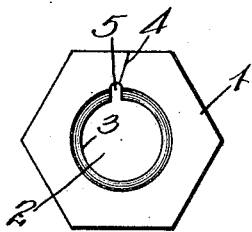

W. E. SHARP.
NUT LOCK.
APPLICATION FILED JULY 20, 1914.

1,216,858.

Patented Feb. 20, 1917.

Witnesses:
Robert H. Weir
Arthur W. Carlson

Inventor:
William E. Sharp
By His Will
Attys.

UNITED STATES PATENT OFFICE.

WILLIAM E. SHARP, OF CHICAGO, ILLINOIS, ASSIGNOR TO GRIP NUT COMPANY, OF CHICAGO, ILLINOIS, A CORPORATION OF ILLINOIS.

NUT-LOCK.

1,216,858.      Specification of Letters Patent.      Patented Feb. 20, 1917.

Application filed July 20, 1914. Serial No. 852,008.

*To all whom it may concern:*

Be it known that I, WILLIAM E. SHARP, a citizen of the United States, residing at Chicago, in the county of Cook and State of Illinois, have invented certain new and useful Improvements in Nut-Locks, of which the following is a description.

My invention belongs to that general class of devices designed to be applied to a bolt as a follower after the holding nut, and to so engage the bolt as to prevent the holding nut from accidentally becoming loosened or backing off by jarring or wear, thus locking the holding nut in position.

To this end my invention consists in the novel form of nut lock herein shown and described, and more particularly pointed out in the drawings.

Figure 2:
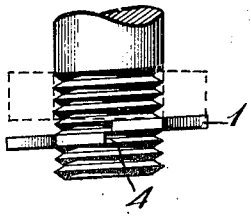
Figure 3:
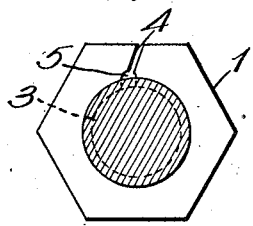

In the drawings, wherein like reference characters indicate like or corresponding parts, Figure 1 is a plan view of my improved nut lock;

Fig. 2 is a transverse view, showing the manner in which the nut lock engages the bolt, and Fig. 3 is a transverse section of the bolt, showing the nut lock in plan after it has been properly engaged with its coöperating bolt.

In the drawings, 1 indicates my improved nut lock, having a bolt hole 2 formed therein. The wall 3 of the bolt hole is formed to engage the thread on the coöperating bolt upon which it is to be used. With the ordinary bolt the wall 3 is V-shaped. The nut lock is completely severed through from wall to wall at a single point, as at 4, and at the point of severance a notch 5 is made in the inner wall, forming a clearance between the proximate ends of the inner wall.

This nut lock is designed and intended to be used, and in practice has been used by me with a bolt which is slightly larger than the opening in the nut lock. That is, taking the standard size bolt, the bolt opening in the nut lock is made sufficiently smaller so that when the nut lock is forcibly mounted on the bolt it will spring the nut lock open at the line of severance 4, as shown in Fig. 3, while its engagement with the spiral thread of the bolt will also spring the nut lock laterally at its point of severance, as clearly shown in Fig. 2. Thus forcing a nut lock on a bolt causes the nut lock to resiliently engage the bolt, while the corners of the slot 5 impinge upon and tend to bite into the body of the bolt, thus being resiliently held in such contact as to prevent the accidental backing off or loosening of the nut lock. Experience with the nut lock in actual practice proves that it is very efficient for the purposes set forth.

Having thus described my invention, what I claim as new and desire to secure by Letters Patent is:

1. A nut lock comprising a plate of suitable metal, having a bolt hole formed therein with its wall adapted to engage a coöperating bolt thread, and having the plate completely severed from the bolt hole to the exterior wall of the plate at a single point, with the walls of said severed part adapted to normally contact with each other, and with the contiguous ends of the threaded portion next the bolt hole transversely slotted to provide a spaced opening between the ends of the thread, whereby the said plate may be sprung upon a coöperating bolt slightly larger than the bolt hole, and will resiliently lock on the bolt, the corners of the slotted opening tending to impinge upon and bite into the bolt.

2. A bolt and nut lock therefor, comprising a threaded bolt, in combination with a nut lock formed from a suitable plate, having a bolt hole formed therein slightly smaller than the diameter of the bolt, the wall of the bolt hole adapted to engage the bolt thread, the said plate being completely severed from the bolt hole to the exterior wall thereof at a single point, with the contiguous ends of the threaded portion next the bolt hole transversely slotted to space the ends of the thread from one another, whereby the lock may be sprung upon the bolt, substantially as described.

In testimony whereof, I have hereunto signed my name in the presence of two subscribing witnesses.

WILLIAM E. SHARP.

Witnesses:
J. W. CUDDY,
CHARLES I. COBB.